US009197848B2

(12) United States Patent
Felkai et al.

(10) Patent No.: US 9,197,848 B2
(45) Date of Patent: Nov. 24, 2015

(54) VIDEO CONFERENCING TRANSITIONS AMONG A PLURALITY OF DEVICES

(75) Inventors: Paul I. Felkai, San Jose, CA (US); Annie Harper, Santa Clara, CA (US); Ratko Jagodic, Santa Clara, CA (US); Rajiv K. Mongia, Redwood City, CA (US); Garth Shoemaker, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 500 days.

(21) Appl. No.: 13/532,656

(22) Filed: Jun. 25, 2012

(65) Prior Publication Data
US 2013/0342637 A1 Dec. 26, 2013

(51) Int. Cl.
*H04N 7/14* (2006.01)
*H04L 29/06* (2006.01)
*H04M 3/56* (2006.01)
*H04N 7/15* (2006.01)

(52) U.S. Cl.
CPC .............. *H04N 7/14* (2013.01); *H04L 65/1093* (2013.01); *H04L 65/403* (2013.01); *H04M 3/567* (2013.01); *H04N 7/15* (2013.01)

(58) Field of Classification Search
CPC ....... H04M 3/54–3/58; H04M 7/0024–7/0057; H04M 9/001; H04M 2203/50–2203/509; H04L 65/403; H04L 65/1093
USPC ............... 348/14.01–14.16; 370/259–271, 370/351–357; 379/201.01, 202.01–207.01, 379/265.01–266.1; 709/201–207, 217–248
See application file for complete search history.

(56) References Cited

U.S. PATENT DOCUMENTS

| | | | |
|---|---|---|---|
| 6,976,055 B1 | 12/2005 | Shaffer et al. | |
| 7,734,793 B2 * | 6/2010 | Bowman-Amuah | 709/228 |
| 8,340,271 B2 * | 12/2012 | Knaz | 379/211.02 |
| 2003/0055977 A1 * | 3/2003 | Miller | 709/227 |
| 2004/0068567 A1 * | 4/2004 | Moran et al. | 709/227 |
| 2006/0040692 A1 * | 2/2006 | Anttila et al. | 455/519 |

(Continued)

FOREIGN PATENT DOCUMENTS

| | | |
|---|---|---|
| GB | 2452020 A | 2/2009 |
| JP | 2011-223506 A | 11/2011 |
| WO | WO2006067278 A | 6/2006 |

OTHER PUBLICATIONS

International Search Report and Written Opinion mailed Sep. 12, 2013 for International Application No. PCT/US2013/042368, 11 pages.

(Continued)

*Primary Examiner* — Hemant Patel
(74) *Attorney, Agent, or Firm* — Schwabe, Williamson & Wyatt, P.C.

(57) ABSTRACT

Embodiments of methods, systems, and storage medium associated with transitioning a video conference session from one device accessible by a user to another device accessible by the user are disclosed herein. In one instance, the method may include detecting at least one condition for transitioning a video conference session from a first device accessible by the user associated with the video conference session to a second device accessible by the user that is not associated with the video conference session, and in response to the detection, transitioning the video conference session to the second device. Other embodiments may be described and/or claimed.

25 Claims, 5 Drawing Sheets

(56) References Cited

U.S. PATENT DOCUMENTS

| | | | |
|---|---|---|---|
| 2006/0083208 A1* | 4/2006 | Lin | 370/338 |
| 2006/0227785 A1* | 10/2006 | Cournut et al. | 370/392 |
| 2009/0220066 A1* | 9/2009 | Shaffer et al. | 379/204.01 |
| 2012/0144007 A1 | 6/2012 | Choong | |
| 2012/0278727 A1* | 11/2012 | Ananthakrishnan et al. | 715/748 |
| 2013/0106975 A1* | 5/2013 | Chu et al. | 348/14.01 |
| 2013/0314491 A1* | 11/2013 | Vivekanandan et al. | 348/14.08 |

OTHER PUBLICATIONS

International Preliminary Report on Patentability mailed Jan. 8, 2015, for International Application No. PCT/US2013/042368, 8 pages.

\* cited by examiner

VIDEO CONFERENCING TRANSITIONS AMONG A PLURALITY OF DEVICES

FIELD

Embodiments of the present disclosure generally relate to the field of data communication, and more particularly, to techniques for providing seamless transitions between different devices accessible by a user during a video conference session.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Current video conference sessions, once initiated, are bound to the same devices of the participants for the life of the session, thereby binding the users to the same locations/environments. However, in some cases, users may have the need to leave the current locations/environments and continue the video conference in a different location or environment, such as another room. In another example, a user may need to continue the video conference session while on the move, for example in a car, bus, or train. In yet another example, a user may need to continue a video conference session from a mobile device to a stationary device, such as a car's infotainment system, when transitioning from walking to riding in the car.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Techniques described herein provide for seamless or near-seamless transitioning between different video conferencing devices accessible by a user. Embodiments described herein may be realized in many forms, including switching of a video conference session between different devices accessible by a user on demand, e.g., in response to a user command, or in response to a change of one or more conditions associated with the user, device accessible by the user, environment, and the like. The transitioning of a video conference session may be either automatic or initiated with a user command. For example, to enable automatic transitioning of a video conference session from one device accessible by a user to another device accessible by the user, one or more of the devices may monitor the relative and/or absolute positions of the devices and transition the video conference session to the other device if the other device will provide the user with better experience than the device currently used by the user. The transition may be based on one or more factors including, but not limited to, screen size and resolution, camera resolution and quality, microphone quality, environmental noise, lighting conditions, number of participants, user's calendar, upcoming activities, and so forth.

User-initiated video conference transitioning may be initiated with a simple command that identifies which device accessible by a user should be hosting a video conference session for the user. The command may be conveyed, for example, by bringing the two devices of the user close to each other or from a distance (e.g., by pointing one device towards the other). For instance, the user may bring her mobile device (e.g., a smartphone) close to a current room-based device of the user and using near-field communication-based technology, simply "scrape" or "grab" the video conference session onto her smartphone. The video conference session may similarly be handed off from the mobile device of the user to the conference room-based device or a vehicle entertainment system associated with the user. For example, the user may point the mobile device of the user to a video screen in the conference room and perform a touch-swipe gesture on the mobile device to transition the video conference session onto the computing device associated with that screen.

Figure 1:
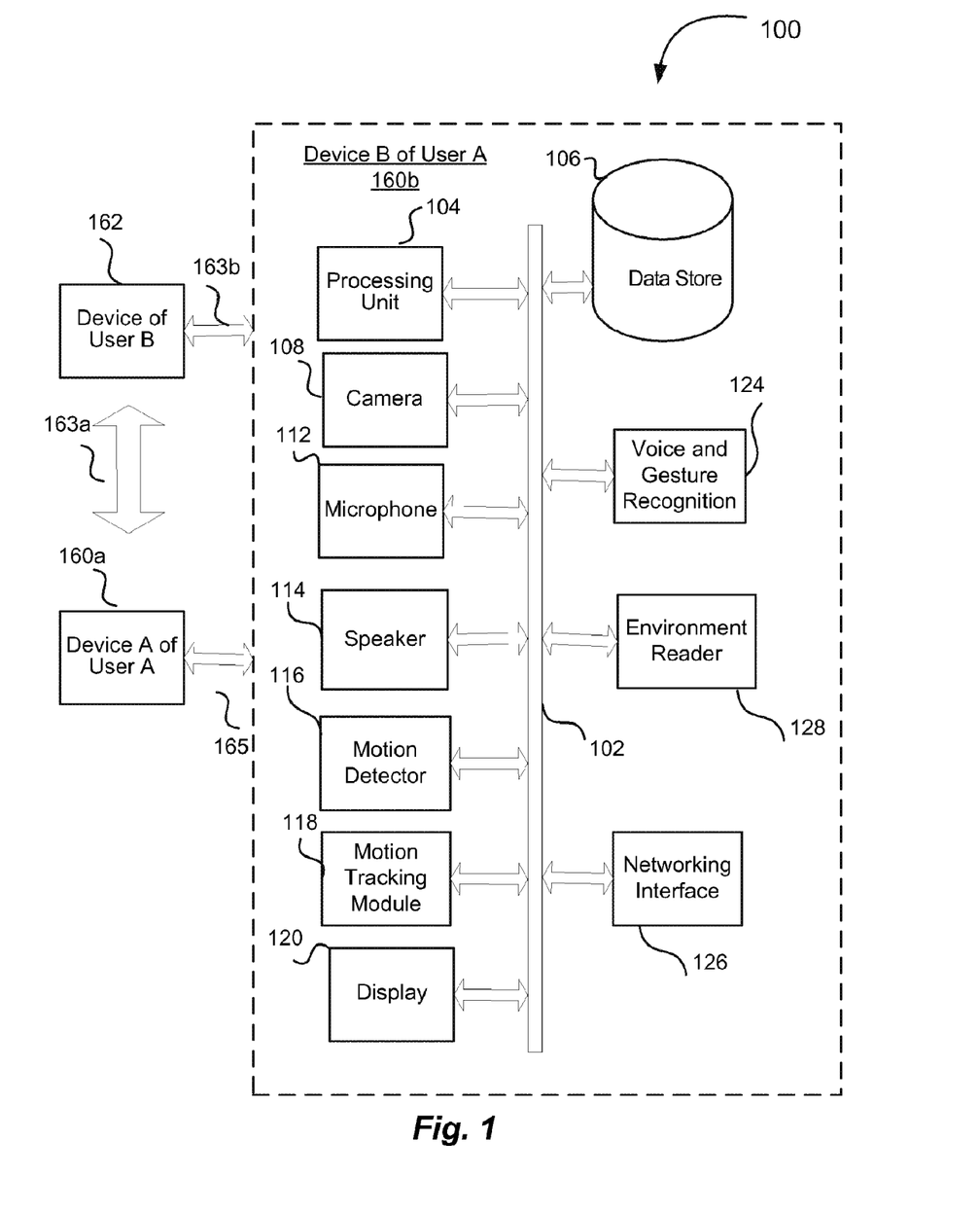
FIG. 1 illustrates an example block diagram of a video conference system configured to provide seamless transition of a video conference session between devices accessible by a user in accordance with various embodiments.

FIG. 1 is a block diagram of an example video conference arrangement 100 suitable for seamless or near-seamless transitioning between different video conferencing devices accessible by a user in accordance with some embodiments. As illustrated user A may be in video conference 163a with user B respectively using devices 160a and 162. As will be described in more detail below, for user A, the video conference session 163a may be seamlessly or near seamlessly transition 165 from device A 160a to device B 160b, and continued 163b, to provide user A with better experience.

The devices of the arrangement 100 are not limited to the system components described herein; other suitable configurations of the devices using different components may be used without departing from the spirit of the present disclosure. For example, as will be further described later, some components or functions performed by devices 160a-160b and 162 may reside or performed by one or more server devices.

For the illustrated embodiments, device B 160b may include a number of components coupled, for example, via an interconnect 102. In one example, the interconnect 102 may include one or more buses. Examples of suitable buses may include, but not limited to, Peripheral Component Interconnect (PCI) buses, Universal Serial Buses (USB), and so forth. The device B 160b may include one or more processing units 104, each having a processor and a memory. Each processor may be a single or multi-core processor. The memory may be volatile or non-volatile, single level or hierarchical. In alternate embodiments, the processing units 104 may share memory. The processing units 104 may be associated with a data store 106 configured to store various types of data, e.g., data associated with the users of the system, data associated with administration of a video conference, data related to a detection of user commands, and the like. For example, the data store 106 may store specific data related to users—participants of a video conference session, such as a number of participants, location of each participant, calendar of events (e.g., upcoming activities that may interfere with the video conference session) associated with each participant, and the like. The data store 106 may be any one of a number of optical, magnetic or solid-state mass storage devices. In another example, the data store 106 may reside at a remote server or in a "cloud" computing environment.

The data store 106 may also store computer-executable instructions that may cause the arrangement (system) 100, when executed by processing unit 104, to perform one or more of the operations described below in reference to the device's components. In another embodiment, the computer-executable instructions may be stored on data store 106 or another, e.g., remote data store and executed, for example, on a server supporting the device B 160*b* described herein. Generally, the instructions may be distributed among the system 100 so as to facilitate dialogs between the system 100 components in order to make informed decisions.

The device B 160*b* may further include one or more components that may be included in a video conference device, such as cameras 108, microphones 112, speaker 114, and the like in order to provide live video and audio feeds for the users of the system. For example, the device B 160*b* may also include a projector (not shown) adapted to project the video conference session to a display (screen) 120. The cameras 108 may include one or more 2D and 3D cameras configured to work in concert to provide depth and high resolution views into the local environment for the remote user, e.g., user B of user device 162. The device B 160*b* may further include one or more microphones 112 (in one embodiment, an array of microphones). The speakers 114 may include any types of speakers, e.g., high fidelity speakers configured to provide high quality remote audio in the local environment. The processing unit 104 may include encoding and/or decoding components configured to encode and/or decode video and audio feeds provided by the components 108, 112, 114. Conventional video conference system setups that include the above-described components are known in the art and will not be described herein. All these components may be used for video conferencing itself as well as for determining the suitable transitions and also for adjustment of video conferencing quality as described below in greater detail.

In addition to video conference system components that may be included in a conventional video conference device and briefly described above, the device B 160*b* may further include one or more components configured to enable a seamless transitioning of a video conference session from device A 160*a* to device B 160*b* of user A. For example, the device B 160*b* may include motion detectors 116 having one or more motion sensors. The motion detectors 116 may be configured to detect motion in the local area, such as help detect presence of user A in the local area and/or identify user A's motions in the area, for example, user A's movement toward the exit of the area. Based on such detection and identification, device B 160*b* (alone or in cooperation with device A 106*a*) may determine whether to initiate a transition of the video conference session 163*a* from device A 160*a* (which may e.g., be a desktop or any other conventional video conference device) to device B 160*b* (which may, e.g., be a tablet computer or a smartphone), thereby allowing user A to continue the video conference session on the move. In alternate embodiments, device A 160*a* may be similarly constituted, and alone or in cooperation with device B 160*b* to initiate the transfer instead. In still other embodiments, e.g., where the video conference session is mediated by a video conference server (not shown) the transfer may be initiated and/or mediated by the video conference server instead.

In another example, the detector 116 may be configured to detect a presence of the device A 160*a* (which may, e.g., be a tablet computer or a smartphone) within a predetermined distance from the device B 160*a*, (which may, e.g., be a desktop computing device or a video conference device). The detection may e.g., be a result of user A bringing device A 160*a* to be within the predetermined distance of the device B 160*b*, thus indicating user A's command to transition the video conference session to device B 160*b*. Based on the detection of the device A 160*a* within the predetermined distance from the device B 160*b*, the device B 160*b* may (alone or in combination with device A 160*a*) determine whether to initiate a transition of the video conference session from the device A 160*a* to device B 160*b*, thereby allowing user A to continue the video conference session on a device with richer video functionalities. Similar to the example of the preceding paragraph, in alternate embodiments, device A 160*a* may be similarly constituted, and alone or in cooperation with device B 160*b* to initiate the transfer instead. In still other embodiments, e.g., where the video conference session is mediated by a video conference server (not shown) the transfer may be initiated and/or mediated by the video conference server instead. The sensors and other detection components described herein do not necessarily have to be a part of a single device such as 160B. Video conference transitions may be initiated based on results from various sensors, from various devices and in the environment itself.

User communications with devices A and B 160*a* and 160*b* may include commands issued by the user, such as verbal commands, touch commands, gesture commands, commands issued via a user interface of the devices, and so forth. Device B 160*b* (or similarly constituted device A 160*a*) may detect a user's intent to issue a command based on a particular position of the user relative to the device. For example, a position of the user's head relative to the screen or display 120 and/or the user's gaze (e.g., user's face pointed directly at the display 120) may be a detectable indication of the user's intent to issue a command. Once a command is issued, device B 160*b* (or similarly constituted device A 160*a*) may identify the command and respond accordingly, transitioning the video conference session as earlier described, thereby providing the user with greater flexibility/mobility, and enhanced experience.

To enable execution of the user commands, device B 160*b* (or similarly constituted device A 160*a*) may include a motion tracking module 118. The motion tracking module 118, working in concert with operating) the cameras 108, may be configured to enable a user to issue commands to device B 160*b* (or similarly constituted device A 160*a*) to transition the video conference session. Module 118 may be configured to perform user face tracking and/or gaze tracking, that is, the ability to detect the perspective that the user is looking into display (screen) 120. In one example, using face or gaze tracking may enable device B 160*b* (or similarly constituted device A 160*a*) to detect user intent to issue a command to transition a video conference session. One skilled in the art will appreciate that there may be alternate approaches in terms of components used to track a presence or motion of a person, for example, by using off the shelf motion detection/ tracking systems, using simple (e.g., low power) motion detector, camera and audio, or other permutations of the components listed above.

Device B 160b (or similarly constituted device A 160a) may further include a voice and gesture recognition module 124 configured to facilitate natural interactions with device B 160b (or similarly constituted device A 160a), such as through voice and gesture commands as briefly described above. For example, the voice and gesture recognition module 124, in concert with the motion tracking module 118, may enable the user to issue a command to the device B 160b (or similarly constituted device A 160a), such as a command to transition the video conference session.

Device B 160b (or similarly constituted device A 160a) may further include a networking interface module 126 configured to facilitate communications with other devices, e.g., device 162 or a video conferencing server ((not shown). Communications between the system 100 components and/or between the system 100 and devices 160 may occur via one or more wired or wireless, private or public network, such as Internet. An example of a wired network may be an Ethernet network. Examples of wireless network may include, but are not limited to, Bluetooth®, WiFi (in accordance with one of Institute of Electrical Engineer's (IEEE) 802.11 standards), or 3G/4G and beyond wireless communication networks.

In one example, the communications between device A 160a and device B 160b may include manifests provided by the devices to each other. For example, devices A and B 160a and 160b may notify each other of their presence in a particular location (e.g., a conference room). The notifications may include one or more capacity parameters associated with each device 160a and 160b, such as screen size, screen resolution, camera characteristics, or microphone characteristics. Based at least in part on the determined capacity parameters, the devices 160a and 160b, alone or in cooperation with each other, may initiate a transition of the video conference session if the capacity parameters of the potential recipient device exceed the corresponding parameters of the device currently being used, and the increase in the capacity parameters is likely to yield better experience for the user.

For example, device B 160b (or similarly constituted device A 160a) may determine the "best" device from the capacity standpoint based on one or more capacity criteria. Such criteria may include, but are not limited to, particular ranges for one or more capacity parameters. For example, only devices with a screen resolution and or camera and microphone characteristics that are above predetermined respective values may be considered as "candidates" for transitioning the session to.

In another example, based at least in part on the determined capacity parameters, device B 160b (or similarly constituted device A 160a) may adjust the broadcast parameters (e.g., settings associated with audio and video feeds) after the session has been transitioned to match the user experience with the session before it was transitioned. For instance, the microphone gain may be adjusted to match the voice output on the previous device.

Device B 160b (or similarly constituted device A 160a) may further include environment reading module 128 configured to detect and measure environmental conditions, such as, for example, ambient light, noise level, outside temperature, and the like. Based at least in part on the determined environmental conditions device B 160b (or similarly constituted device A 160a) may make a determination regarding transitioning a video conference session. In another example, based at least in part on the determined environmental conditions device B 160b (or similarly constituted device A 160a) may adjust the broadcast parameters (e.g., parameters associated with audio and video feeds) depending on the changed environmental conditions, for example, after the session has been transitioned.

In various embodiments, either the current hosting device or the succeeding hosting device may inform the counterpart devices or the mediating video conference server to establish communication with the succeeding hosting device. In embodiments where mediating video conference server is used, the mediating video conference server may inform the succeeding hosting device to establish communication. Similarly, in various embodiments, either the current hosting device or the succeeding hosting device may inform the counterpart devices or the mediating video conference server to terminate communication with the previous hosting device after transition. In various embodiments, the current hosting device may continue running the conference while the succeeding device starts running the conference in addition to the current hosting device. In embodiments where mediating video conference server is used, the mediating video conference server may inform the previous hosting device to terminate communication after transition.

Figure 2:
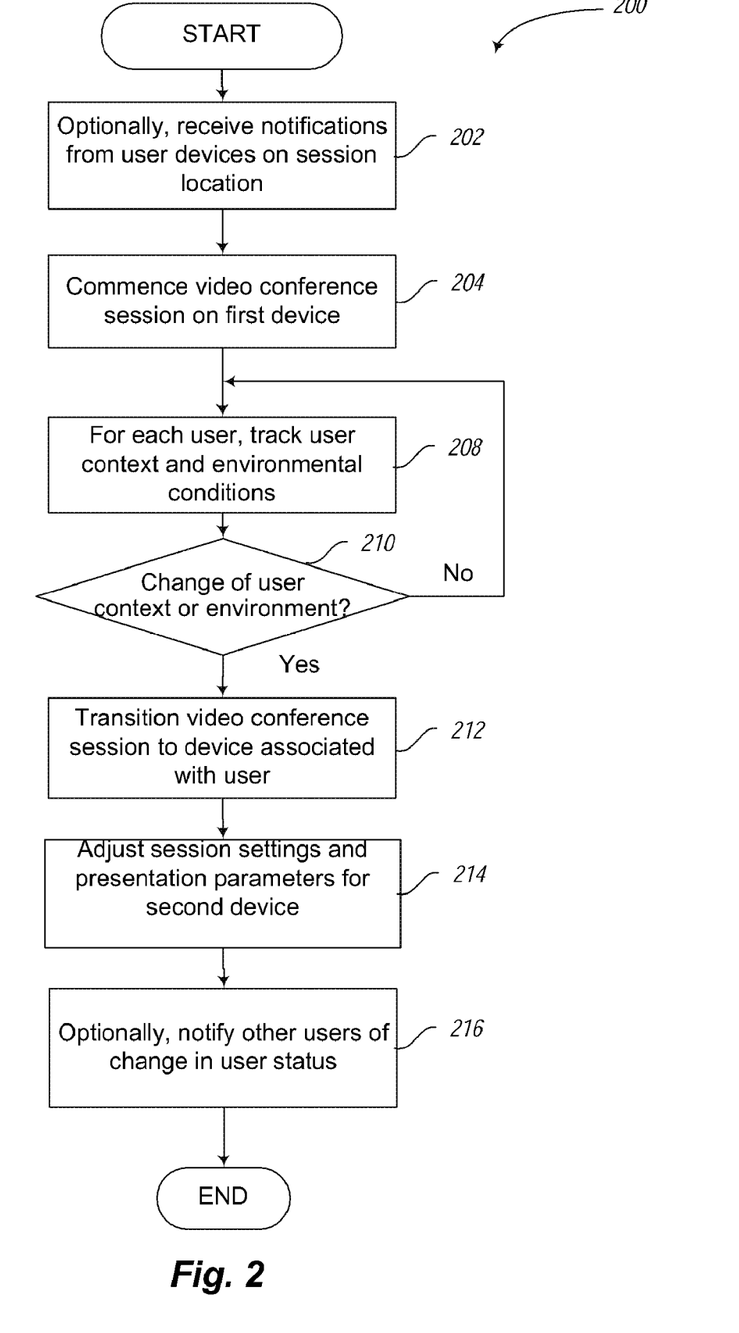
FIG. 2 illustrates a process flow diagram for enabling seamless transition of a video conference session between different devices accessible by a user in accordance with various embodiments.

FIG. 2 illustrates a process flow diagram for operation of a video conference that includes seamless transition of a video conference session between devices accessible by a user as early described with references to FIG. 1, in accordance with various embodiments. The process 200 may begin at block 202, where the user devices may receive notifications from a mediating video conference server or one of the user devices (in peer-to-peer embodiments) indicating that a video conference session is about to commence. For example, the user devices may have registered with the mediating video conference server or with each other (for peer-to-peer embodiments) or otherwise manifest their association with the respective users to participate in the video conference. The notifications may include desired capacity parameters associated with each device and other parameters relevant for the video conference session, e.g., transmission protocol, encoding scheme and so forth. The capacity parameters may include, but are not limited to, screen resolution, screen size, microphone, speaker, video camera characteristics, and so forth.

At block 204, the video conference session may commence. In various embodiments, the devices accessible by a user, through communication with each other, may be aware of the status, location, capacity, configuration, and so forth of the other devices of the user. For these embodiments, one of the devices accessible by a user may engage itself with the video conference on determining that among the various devices of the user, it may be the currently most suitable device, e.g., the device with the "best" capacity parameters, proximate to the user. As described above, this determination may be based on one or more capacity criteria. Such criteria may include, but are not limited to, particular ranges for one or more capacity parameters. For example, only devices with a screen resolution and or camera and microphone characteristics that are above predetermined respective values may be considered as "candidates" for hosting the session for the users. Further, for these embodiments, the devices accessible by a user may select a device with the most suitable capacity parameters proximate to the user, and designate the selected device to host the video conference session for the user. In embodiments, the devices may include components configured to provide seamless transition of the video conference session for a user, as described in reference to FIG. 1. For example, the devices may include motion detector 116, motion tracking module 118, environment reader 128, and so forth.

In various embodiments, when more than one device (e.g., a laptop and a smartphone) are determined to be associated with and proximate to the user, the devices may select among the devices a device that may be most suitable in view of other factors, in addition to the capacity consideration. For example, for a particular user, the devices accessible by the user may determine that the user's laptop is best suited for hosting the session as compared to the user's smartphone, if both are proximate to the user at the time. The determination may be based on location information, and/or user activities as determined from monitoring.

At block 208, the user context information and other related information (e.g., environmental conditions) of at least one user may be tracked by one or more devices associated with the user. The user context information accessible by a user may include user-associated data, such as calendar-scheduled upcoming events that may interfere (e.g., overlap) with the session, ambient light, noise, user location, user-associated device position (e.g., relative to a system component, such as a system computing device), current user activity (e.g., the user is currently leaving the room or talking on the telephone) and so forth, of the user. The relative and absolute position of the devices accessible by the user and the user may be gathered using various technologies such as indoor Wi-Fi positioning, Global Positioning System (GPS) tracking, compass, accelerometers, camera-based user tracking and recognition, radio frequency identification (RFID)-based user tracking and identification etc.

Among the user context information and environmental information a number of conditions of the one or more users may be detected, determined, or otherwise identified at decision block 210 that may initiate a transition of the video conference from one device of the user to another device of the user (e.g., from a first device accessible by the user such as a laptop, to a second device of the user such as a smartphone). For example, it may be determined that the user position has changed such that another device accessible by the user that is currently not hosting the session (e.g., a desktop) is now within a predetermined distance from the user.

In another example, it may be determined that the user position relative to the current hosting device is changing, such as when the user is leaving the current hosting device in the conference room. In another example, it may be determined that the user environment has changed, e.g., the hosting device or a device accessible by the user may detect a change in ambient light, environmental noise, and the like, and use any of these changes as an event to cause transition of the video conference session to another device accessible by the user to provider the user with better experience.

In yet another example, a user-initiated command may be detected by the hosting or a currently not used device that may direct the device to transition the video conference session to the other device accessible by the user (e.g., smartphone). As described above, commands issued by the user may include verbal commands, touch commands, gesture commands, commands issued via a user interface of a user device, commands initiated by bringing one device accessible by the user within a predetermined distance from another device accessible by the user.

In summary, a change of one or more conditions associated with the user context and/or user environment may be determined by the one or more devices accessible by the user as an event to initiate transitioning of the video conference session from a current host device accessible by the user to another associated device accessible by the user. The tracking of user context and environmental conditions will be described in more detail in reference to FIG. 3.

If at block 210 it is determined for a user that a change of one or more conditions has occurred for the user, the devices accessible by the user may transition the video conference session to one of the other devices at block 212. In various embodiments, the current hosting device may offer to transition the video conference session to another device accessible by the user, and transition the video conference session upon receipt of acceptance of the offer by the other device, as described below in reference to FIG. 3.

Still referring to FIG. 2, based at least in part on the determined environmental conditions and the capacity parameters of the device accessible by the user to which the video conference session was transitioned, at block 214, the device assuming the hosting may adjust the broadcast parameters (e.g., parameters associated with audio and video feeds) for the user device or device accessible by the user. For example, the video and audio quality settings (e.g., color of the video feed, size of the video feed such as zoom, volume of the audio feed, and the like) may be adjusted to best match the experience on the previous hosting device accessible by the user. For instance, the device assuming hosting may adjust the microphone gain to match the voice output on the previous hosting device accessible by the user. In another example, the device assuming hosting may adjust the presentation parameters to the target environment (e.g., screen size) for any documents being shared during the video conference session.

At block 216, other video conference session participants (or their devices) may be notified of the new status accessible by the user with its video conference session transitioned, so that the other participants may be aware of new limitations, if any, or capabilities for that user. The new status may include the adjusted presentation and video and quality settings for the transitioned video conference session.

Figure 3:
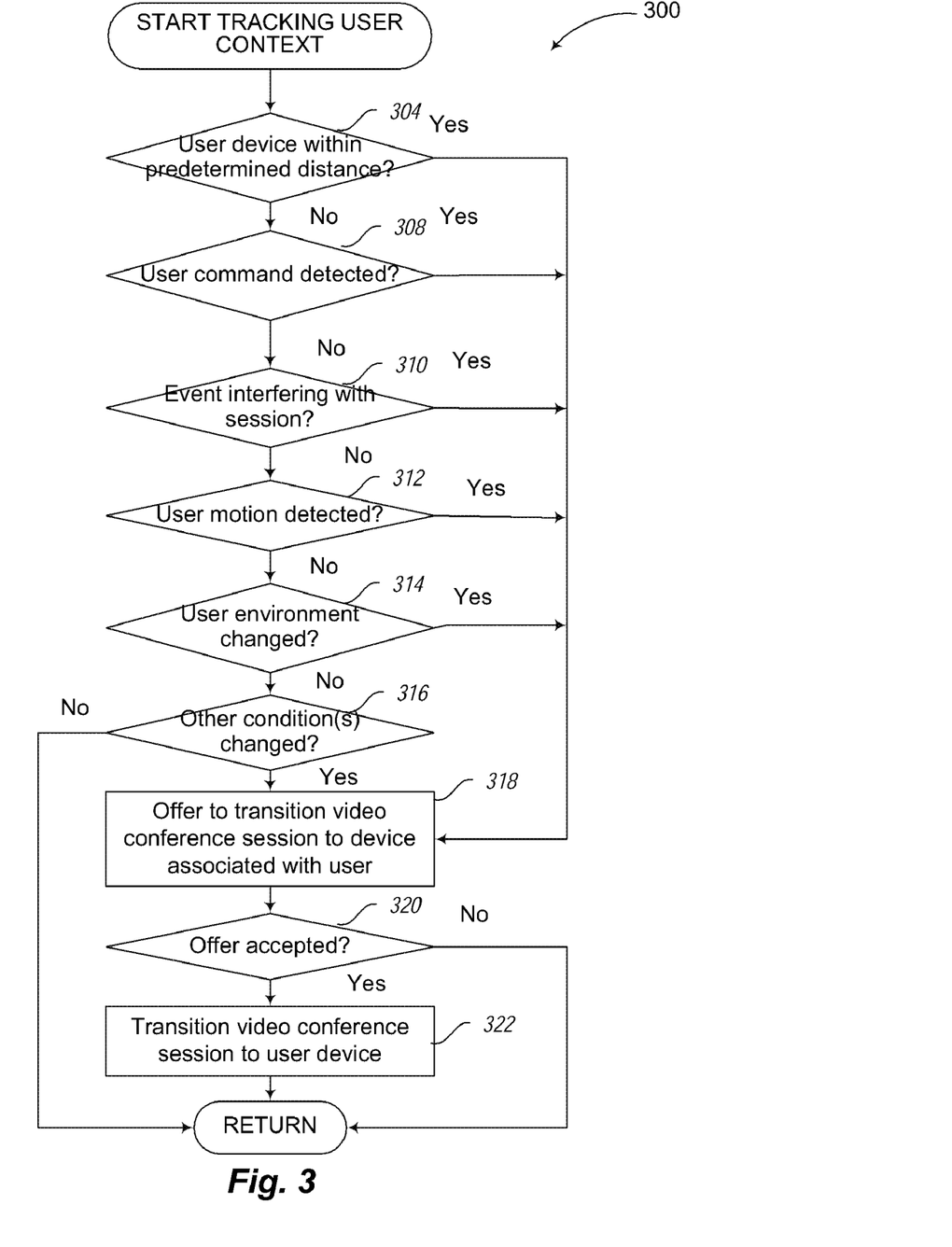
FIG. 3 illustrates another process flow diagram for tracking conditions that initiate transitioning of a video conference session to another device accessible by a user in accordance with various embodiments.

FIG. 3 is a process flow diagram illustrating a process for tracking conditions that may initiate transitioning of a video conference session to another device accessible by a user in accordance with various embodiments. As described above, among the user context information and environmental information accessible by a user, a number of conditions may be determined that may initiate a transition of the video conference session from one device accessible by a user to another device accessible by the user. The process illustrated in FIG. 3 is but an example of implementation of the seamless transitioning of a video conference session between devices accessible by the user; other processes or variations may be implemented depending on user devices and the concrete computing environment.

The tracking conditions process 300 may begin at decision block 304, where it may be determined whether a currently non-hosting device accessible by a user is within a predetermined distance from the user. If the user has moved closer to the currently non-hosting device (e.g., within a predetermined distance), the hosting device or the currently non-hosting device may detect that motion and transition or offer to transition a video conference session to the currently non-hosting device as illustrated at block 318. If no currently non-hosting device accessible by the user within the predetermined distance from the user is detected, the process 300 may move to decision block 308. It should be noted that the detection of the non-hosting device within a predetermined distance of the hosting device is one example of the video conference transition initiation. In general, the system may offer different cues to offer a transition of a video conference, some of which are described below. It should be also noted that offering to transition a conference by the system may not be necessary. In some embodiments, the system may transition the conference based on the system's internal determinations of a necessity of transition associated, for example, with a user command to transition, as described below.

At decision block 308 it may be determined whether a command is issued by the user. As described above, commands issued by the user may include verbal commands, touch commands, gesture commands, commands issued via a user interface of a user device, commands initiated by bringing a user device within a predetermined distance from the system, and the like. For example, the user may interact with a touch-enabled screen of the hosting device accessible by the user (or a currently non-hosting device accessible by the user) to execute a particular command. In another example, the "transition" command may be issued, e.g., as a voice command, for example, "Move session to my iPhone." In another example, there may be a special gesture command indicating a request to switch the video conference session to a particular device accessible by the user.

In one example, it may be determined whether the user intends to issue a command. This determination may be based on a number of different indicators that may be detected by the hosting device accessible by the user or a currently non-hosting device accessible by the user. For example, the hosting device accessible by the user or a currently non-hosting device accessible by the user may detect a position accessible by the user's face relative to the screen of its display. If the user's face is pointed directly at the screen or turned toward the screen, such face position may be an indicator that the user intends to issue a command to the device, in another example, the hosting device accessible by the user or a currently non-hosting device accessible by the user may track the user's gaze. If the user looks directly at the screen, this may also serve as an indicator accessible by the user's intent to issue a command to the device. In yet another example, an air gesture may serve as an indicator accessible by the user's intent to issue a command. The commands may not be limited to the commands described by the process 300. Other user-initiated commands may be added and stored in association with the devices accessible by the user as needed.

If it is determined at decision block 308 that a user command is issued, the process 300 may move to block 318. If it is determined at decision block 308 that no command is issued, the process 300 may move to decision block 310. At decision block 310 it may be determined whether an event interfering with the video conference session is taking place (or about to take place). For example, for a particular user it may be determined that a user has a conflicting meeting on her calendar that overlaps with the current video conference session. In another example, it may be determined that a user is on the telephone or otherwise engaged (e.g., browsing the Internet).

If an interfering event is taking place, the process 300 may move to block 318. If no interfering event is determined at decision block 310, the process 300 may move to decision block 312. At decision block 312 it may be determined whether a user motion is detected. As described above, the user motion may be detected using various technologies such as indoor Wi-Fi positioning, GPS tracking, compass, accelerometers, camera-based user tracking and recognition, RFID-based user tracking and identification, and the like. The user motion may indicate, for example, that a user is leaving an area (e.g., a conference room). The detection of change of the user location at block 312 may initiate a video conference session transition process as indicated by block 318. If no user motion is detected at block 312, the process 300 may move to decision block 314.

At decision block 314 it may be determined whether any conditions or parameters of the user environment have changed. For example, ambient light, noise, user location or other parameters of user environment may change, which may be detected at decision block 314. For example, the user may get in a car and turn on the engine, which may be detected by the hosting device accessible by the user or a currently non-hosting device accessible by the user. The user may leave the car and turn off the engine (and lock the door), which events likewise may be detected by the hosting device accessible by the user or a currently non-hosting device accessible by the user. In another example, initially, a user may be driving a car and the car infotainment system is hosting the video conference session. When the user turns the car engine off, the session may be transition to another available device accessible by the user, e.g., her smartphone. In yet another example, initially, the user may be walking to her car, with her smartphone hosting a video conference session. The smartphone or the infotainment system of the car may determine that the user turned the car engine on and use this event as a trigger to transition the video conference session from the smartphone to the car infotainment system.

If any of the user environment conditions are determined to have changed, the process 300 may move to block 318. Otherwise, the process 300 may move to decision block 316. At decision block 316 any other conditions may be detected that are not specifically described in blocks 304, 308, 310, 312, and 314. The conditions that may trigger a transition of a video conference session may not be limited to the ones described by the process 300. Other conditions may be identified, added to the existing list of conditions, and stored in association with a mediating video conference server or one of the devices accessible by the user as needed. Accordingly, if no conditions are determined to take place, the process 300 may return to the beginning. If any of the other conditions are determined to take place (e.g., detected) at decision block 316, the process 300 may move to block 318, where the hosting device accessible by the user or a currently non-hosting device accessible by the user may offer an option to transition the video conference session. For example, the non-hosting smartphone accessible by the user may display a message on the smartphone indicating an offer to transition the video conference session to the smartphone. The user may accept or reject the option. In another example, the user may ignore the option, which may serve as a learning tool for the system. If at decision block 320 it is determined that the user accepted the offer to transition, at block 322 the video conference session may be transitioned to another device accessible by the user. If the offer to transition is determined to have been rejected, the process 300 returns to the beginning.

Figure 4:
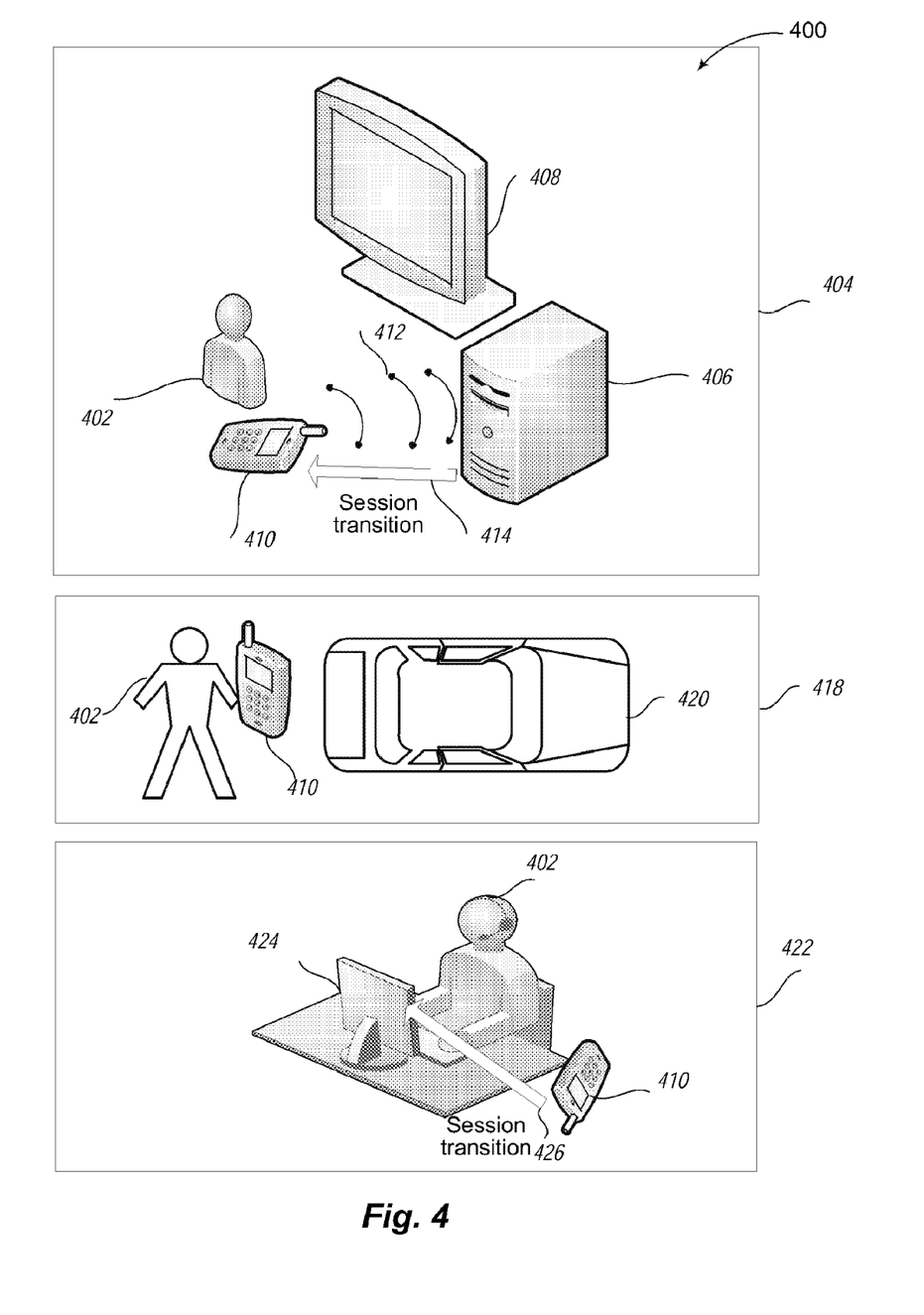
FIG. 4 illustrates an environment in which seamless transition of a video conference session between different devices accessible by a user may be practiced in accordance with various embodiments.

FIG. 4 illustrates an example environment 400 in which various embodiments may be practiced in accordance with some embodiments. The environment 400 may include a user 402 in an area (e.g., conference room) 404 being engaged in a video conference session provided by a computing device (e.g., server) 406 and a display (screen) 408. The user device (e.g., smartphone) 410 may notify the system about its presence in the location 404 as indicated by waves 412 and provide server 406 with its capacity parameters, as described in reference to FIGS. 1 and 2. If a condition triggering a video conference session transfer is detected by the server 406 or smartphone 410 (e.g., device 410 is determined to be within a predetermined distance from the server 406), the video conference session transfer to the device 410 may be initiated as described in reference to FIG. 3 and indicated by the arrow 414.

The user 402 may then move to a different area 418 (e.g., a street) moving toward her car 420 while having the video conference session on her device 410. As described above in reference to FIG. 3, when the user enters her car 420 and turns on the engine, the session may transition to the car infotainment system (not shown) for the duration of the user trip. When the user leaves the car 420, the session may be transitioned back to device 410. The user then may enter area 422 (e.g., user's office space) having a user device (e.g., desktop computer) 424. When the presence of the desktop computer 424 is identified and another transition-triggering condition is detected, e.g., the computer 424 is determined to be within the predetermined distance from the user or device 410 (current hosting device), the video conference session may be transitioned from device 410 to device 424, as indicated by the arrow 426.

Thus, it can be seen that under the present disclosure, the user 402 may continue the session via devices 406, 410 and 424, as the user transition from one conference room at one location to another office at another location.

Figure 5:
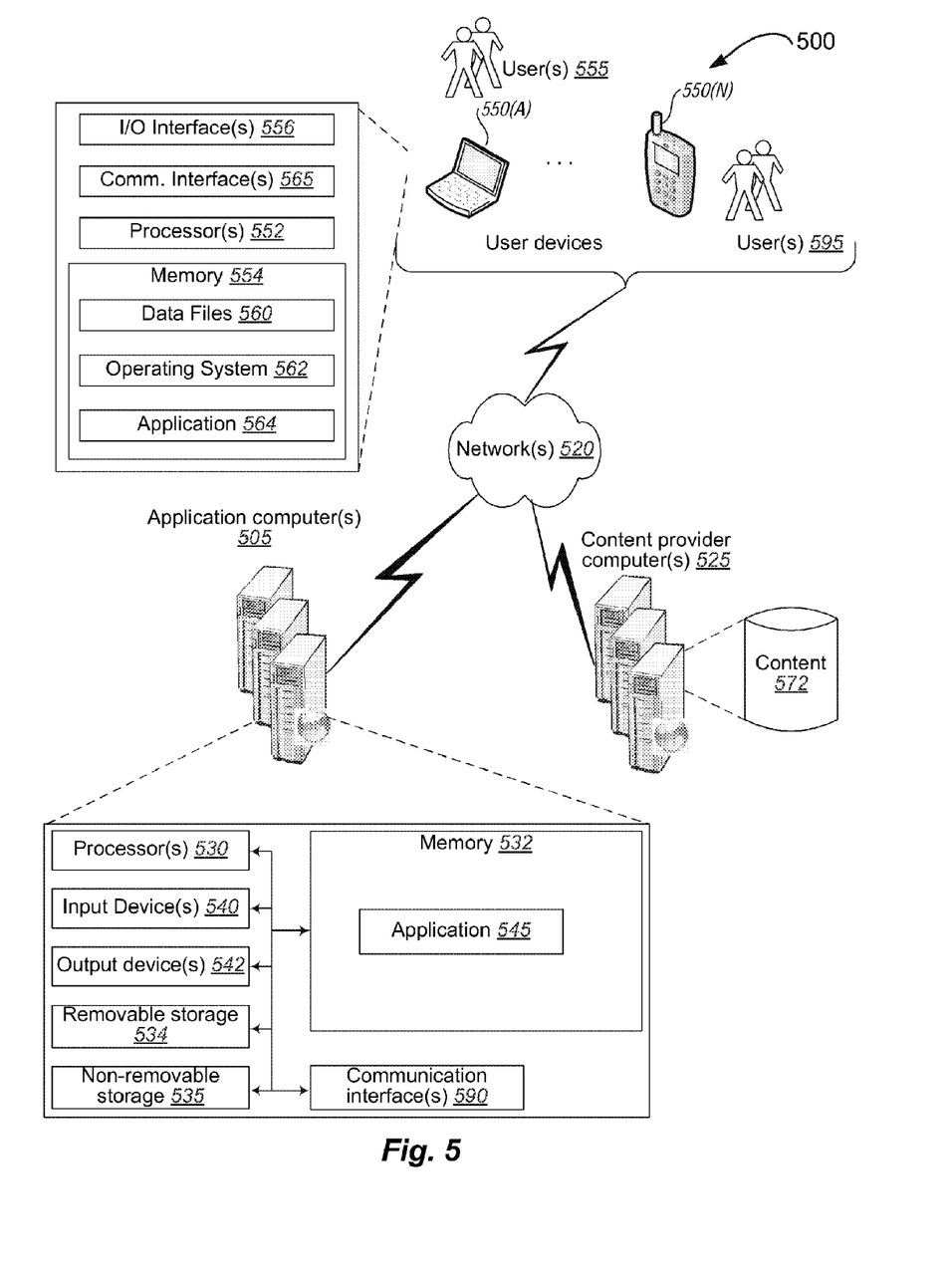
FIG. 5 illustrates an environment in which various embodiments of a video conference system configured to provide seamless transition of a video conference session between devices accessible by a user may be implemented.

FIG. 5 illustrates an example environment (e.g., system) 500 suitable for implementing mediated embodiments of the video conference arrangement described herein in accordance with various embodiments. As will be appreciated, although a Web-based environment is used for purposes of explanation, different environments may be used, as appropriate, to implement various embodiments. The environment 500 may include user devices 550(A)-550(N) of various users, one or more devices 550(A)-550(N) may be associated with each user 555, or 595. Various devices 550(A)-550(N) may include computing devices equipped as earlier described with references to FIG. 1, and operable to participate in a video conference session provided over an appropriate network 520. Each one of devices 550(A)-550(N) may include a processor 552 and memory 554 for storing processor-executable instructions, such as data files 560, operating system 562, and one or more applications 564, such as the client side of a video conferencing application, and applications configured to enable the tracking of conditions for initiating a transition of a video conference from one device accessible by a user to another device accessible by a user, to enable seamless transition of the video conference between devices 550(A)-550(N) accessible by the user.

Each one of devices 550(A)-550(N) may further include at least one or both of the following elements: input/output interface 556 designed to enable peripheral component interaction with the system 500 and communication interface 565. In various embodiments, the input/output interface 556 may include, but is not limited to, a display, e.g., a liquid crystal display, a touch screen display, etc., a speaker, a microphone, a video camera, and other components described in reference to FIG. 1. For embodiments including a display supporting touch screen features, the system 500 may include a touch screen controller for facilitating control of the display. As discussed above, operating system 562 and/or an application 564 may include software components configured, when executed on the processor 552, to cause the system 500 to perform one or more operations enabling a seamless transition of a video conference session among devices 550(A)-550(N) accessible by a user as described in reference to FIGS. 1-4.

The network 520 may include any appropriate network or networks, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network may be enabled by wired or wireless connections, and combinations thereof. In one example, the illustrative environment 500 may be configured to provide the capabilities described in reference to FIGS. 1-4 using devices 550(A)-550(N) that may be connected through a network described above, to application computers 505 and content provider computers (e.g., servers) 525. For example, content associated with video conferencing may be stored on the devices 550(A) and 550(N) and communicated between the devices 550(A) and 550(N) via a network or direct connection, taking advantage of the computing resources associated with the respective endpoints, such as a local device 550(A) and remote device 550(N).

In another example, the network may include the Internet, and the environment may include one or more Web servers (content provider servers) 525 for receiving requests and serving content in response thereto, although for other networks, an alternative device serving a similar purpose could be used, as would be apparent to one of ordinary skill in the art. The illustrative environment 500 may also include at least one application computer (e.g., server) 505 including, or associated with, one or more processors 530, input devices 540, output devices 542 administrative input/output devices), removable storage 534, and non-removable storage 535 that may be connected to a communication interface 590 and memory 532. As discussed above, in one embodiment, one or more applications 545 may include a video conferencing application, and configured to cooperate with, e.g., applications 564 to mediate a video conference session, and enable seamless transition of the video conference session between devices 550(A), 550(N) accessible by a user. Applications 545 may reside on the server 505 and execute thereon. In alternate embodiments, applications 545 may execute partly on the device 550 and partly on server 505. Accordingly, the memory 532 may include application module 545 or server-side of application module 545.

The handling of all requests and responses, for example, the requests for content initiated by the user 595 as well as the delivery of content between the devices 550(A)-550(N) and the application server 505, may be handled by one or more content provider Web servers 525. The content data store 572 may be associated with the server 525. The data store 572 is operable, through logic associated therewith, to receive instructions from the server 525 and obtain, update, or otherwise process data in response thereto.

Each server may include an operating system that provides executable program instructions for the general administration and operation of that server, and typically may include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 500 may include a variety of data stores and other memory and storage media as discussed above. These may reside in a variety of locations, such as on a storage medium local to (and/or resident in) one or more of the computers or remote from any or all of the computers across the network. Any necessary files for performing the functions attributed to the computers, servers, or other network devices may be stored locally and/or remotely, as appropriate. The storage media may include disk drives, optical storage devices, and solid-state storage devices, such as random access memory (RAM) or read-only memory (ROM), flash memory or other memory technology, CD-ROM, digital versatile disk (DVD) or other optical storage, magnetic cassettes, magnetic tape, magnetic disk storage or other magnetic storage devices, as well as removable media devices, memory cards, flash cards, or any other medium which may be used to store the desired information and which may be accessed by a processor.

The environment (system) 500 may be a distributed interaction environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 5. Thus, the depiction of the system 500 in FIG. 5 should be taken as being illustrative in nature, and not limited to the scope of the disclosure.

According to various embodiments, the present disclosure describes a computing device-readable storage medium having executable instructions stored thereon that, in response to execution by a computing device of a video conference system, cause the computing device to detect at least one condition for transitioning a video conference session from a first device accessible by a user associated with the video conference session to a second device accessible by the user that is not associated with the video conference session, and in response to the detection, transition the information associated with the video conference session to the second device. The video conference session may be provided by the video conference system.

According to various embodiments, the present disclosure describes a computing device comprising a processor and a video conferencing associated application operated by the processor to detect at least one condition for transitioning a video conference session from a first device accessible by a user associated with the video conference session to a second device accessible by the user that is not associated with the video conference session; and in response to a detection, transition the video conference session to the second device.

According to various embodiments, the present disclosure describes a computer-implemented method comprising detecting at least one condition for transitioning a video conference session from a first device associated with the video conference session to a second device that is not associated with the video conference session, wherein the video conference session is provided by the video conference system, and in response to a detection, transitioning the information associated with the video conference session to the second device. The video conference session may be provided by the video conference system.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed is:

1. At least one non-transitory computing device-readable storage medium having instructions stored thereon that, in response to execution by a computing device, cause the computing device to:

detect at least one condition for transitioning a video conference session from a first device accessible by a user associated with the video conference session to a second device accessible by the user that is not associated with the video conference session, wherein the at least one condition is detected independently of a user command to transition to the video conference session, and the at least one condition includes an event which conflicts with the video conference session; and in response to a detection of the at least one condition, transition the video conference session to the second device.

2. The non-transitory computing device-readable storage medium of claim 1, wherein the second device is associated with the video conference session after the video conference session is transitioned to the second device.

3. The non-transitory computing device-readable storage medium of claim 1, wherein the second device is selected from a plurality of devices that is not associated with the video conference session at a time of selection.

4. The non-transitory computing device-readable storage medium of claim 3, wherein the at least one condition includes one or more capacity parameters associated with the second device, the capacity parameters including at least one of: screen size, screen resolution, camera characteristics, or microphone characteristics.

5. The non-transitory computing device-readable storage medium of claim 4, wherein the instructions, in response to execution by the computing device, further cause the computing device to:

determine the capacity parameters for each of the plurality of devices; and select the second device among the plurality of devices based at least in part on the determined capacity parameters.

6. The non-transitory computing device-readable storage medium of claim 1, wherein the at least one condition includes one or more environmental parameters, the environmental parameters including noise and lighting conditions of environment associated with the second device.

7. The non-transitory computing device-readable storage medium of claim 1, wherein the at least one condition includes one or more characteristics associated with a user of the second device, the one or more characteristics including at least one of: a location of the user, upcoming activities associated with the user, or change of position of the second device relative to the first device.

8. The non-transitory computing device-readable storage medium of claim 1, wherein the second device is a mobile device, wherein the mobile device is selected from at least one of: a smartphone, a laptop or a tablet computing device.

9. The non-transitory computing device-readable storage medium of claim 1, wherein transition of the video conference session includes transition of at least one of a video or audio feed associated with the video conference session.

10. The non-transitory computing device-readable storage medium of claim 1, wherein the instructions, in response to execution by the computing device, further cause the computing device to adjust one or more quality parameters associated with the transitioned information, the adjustment corresponding to capacity parameters associated with the second device.

11. The non-transitory computing device-readable storage medium of claim 10, wherein the instructions, in response to execution by a computing device, further cause the computing device to notify other devices associated with the video conference session of a status of the second device, wherein the status of the second device includes the capacity parameters of the second device.

12. The non-transitory computing device-readable storage medium of claim 1, wherein the at least one condition also includes a command to transition the video conference session to the second device, wherein the command is based at least in part on a user input.

13. The non-transitory computing device-readable storage medium of claim 12, wherein the user input includes at least one of: pointing the second device to the first device or selecting a selectable element on a user interface associated with the second device, the second device configured to provide the command resulted from the selection of the selectable element to the video conference system.

14. The non-transitory computing device-readable storage medium of claim 1, wherein the instructions in response to execution by a computing device further cause the computing device to detect a position of the second device relative to the first device, wherein the detection of the at least one condition includes a determination that the second device is positioned within a predetermined distance from the first device.

15. The non-transitory computing device-readable storage medium of claim 1, wherein the computing device is a selected one of the first device, the second device, or a computing device independent of the first and second devices.

16. The non-transitory computing device-readable storage medium of claim 10, wherein the adjustment further corresponds to environmental parameters including noise and lighting conditions of environment associated with the second device, wherein the quality parameters include at least one of one or more video settings or one or more audio settings associated with the transitioned information, and wherein the capacity parameters include at least one of: screen size, screen resolution, camera characteristics, and microphone characteristics.

17. A computing device comprising:
a processor; and
a video conferencing associated application operated by the processor to:
  detect at least one condition for transitioning a video conference session from a first device accessible by a user associated with the video conference session to a second device accessible by the user that is not associated with the video conference session, wherein the at least one condition is detected independently of a user command to transition to the video conference session, and the at least one condition includes an event which conflicts with the video conference session; and
  in response to a detection of the at least one condition, transition the video conference session to the second device.

18. The computing device of claim 17, wherein the second device is associated with the video conference session after the video conference session is transitioned to the second device.

19. The computing device of claim 17, wherein the video conferencing associated application is further configured to:
  determine capacity parameters for each of a plurality of devices; and
  select the second device among the plurality of devices based at least in part on the determined capacity parameters.

20. The computing device of claim 17, wherein the at least one condition includes one or more environmental parameters, the environmental parameters including noise and lighting conditions of environment associated with the second device.

21. The computing device of claim 17, wherein the at least one condition includes one or more characteristics associated with a user of the second device, the one or more characteristics including at least one of: a location of the user, upcoming activities associated with the user, or change of position of the second device relative to the first device.

22. The computing device of claim 17, wherein the computing device is a selected one of the first device, the second device, or independent of the first and second devices.

23. A computer-implemented method comprising:
under control of one or more computing devices,
detecting at least one condition for transitioning a video conference session from a first device associated with the video conference session to a second device that is not associated with the video conference session, wherein the video conference session is provided by the video conference system, and wherein the at least one condition is detected independently of a user command to transition to the video conference session, and the at least one condition includes an event which conflicts with the video conference session; and
in response to a detection of the at least one condition, transitioning the information associated with the video conference session to the second device.

24. The computer-implemented method of claim 23, further comprising adjusting presentation parameters associated with a document being shared among the devices associated the ongoing video conference session.

25. The computer-implemented method of claim 23, wherein the at least one condition includes at least one of one or more environmental parameters or one or more characteristics associated with a user accessing the second device, the environmental parameters including noise and lighting conditions of environment associated with the second device, the one or more characteristics including at least one of: a location of the user, upcoming activities associated with the user, or change of position of the second device relative to the first device.

* * * * *